(12) United States Patent
Wallace

(10) Patent No.: US 6,191,703 B1
(45) Date of Patent: Feb. 20, 2001

(54) REMOTE CONVIENCE SYSTEM AND METHOD WITH PROXIMITY-BASED DISABLEMENT RFO PREVENTING INADVERTENT FUNCTION ACTIVATION

(75) Inventor: Mark D. Wallace, Waterford, MI (US)

(73) Assignee: TRW Inc., Lyndhurst, OH (US)

( * ) Notice: Under 35 U.S.C. 154(b), the term of this patent shall be extended for 0 days.

(21) Appl. No.: 09/080,365

(22) Filed: Mar. 31, 1998

(51) Int. Cl.⁷ .................................................. G08C 19/00
(52) U.S. Cl. .............................. 340/825.69; 340/825.72; 340/825.31; 340/10.1; 340/10.2; 340/10.3
(58) Field of Search ............................. 340/825.31, 10.1, 340/10.2, 10.3, 10.4, 10.41, 10.42, 825.69, 825.72, 426

(56) References Cited

U.S. PATENT DOCUMENTS

| | | |
|---|---|---|
| 4,200,227 | 4/1980 | Lemelson . |
| 4,383,242 | 5/1983 | Sassover et al. . |
| 4,438,426 | 3/1984 | Adkins . |
| 4,471,343 | 9/1984 | Lemelson . |
| 4,738,334 | 4/1988 | Weishaupt . |
| 4,918,955 | 4/1990 | Kimura et al. . |
| 4,965,460 | 10/1990 | Tanaka et al. . |
| 5,117,097 | 5/1992 | Kimura et al. . |
| 5,539,260 | 7/1996 | Khangura et al. . |
| 5,774,043 | * 6/1998 | Mizuno et al. ....................... 340/426 |
| 5,808,372 | * 9/1998 | Shwegler et al. ................... 307/10.3 |

* cited by examiner

Primary Examiner—Michael Horabik
Assistant Examiner—William L. Bangachon
(74) Attorney, Agent, or Firm—Tarolli, Sundheim, Covell, Tummino & Szabo L.L.P.

(57) ABSTRACT

A remote convenience system (10) of a vehicle (12) allows remote control operation of one or more vehicle functions (e.g., lock or unlock of vehicle doors). A portable transmitter (14) of the system (10) transmits a signal (40), having a remote convenience function request, to a receiver (46). In response to the signal (40), the receiver (46) causes performance of the requested remote convenience function. The transmitter (14) is connected with a key (16) that is used for the vehicle (12). Preferably, the key (16) is an ignition key and the transmitter (14) is integrated into the key. The key (16) has a transponder (58) that is interrogated by an interrogation coil (62) to provide a code stored within the transponder. An immobilizer control (60) is operatively connected with the coil (62) and also an electronic engine control (68). Operation of the vehicle (12) is only permitted if the transponder provides the proper code. The receiver (46) is also operatively connected to the immobilizer control (60), and when the key (16) is being inserted into an ignition switch (64), the remote convenience functions are disabled to prevent inadvertent performance of the functions.

27 Claims, 8 Drawing Sheets

REMOTE CONVIENCE SYSTEM AND METHOD WITH PROXIMITY-BASED DISABLEMENT RFO PREVENTING INADVERTENT FUNCTION ACTIVATION

FIELD OF THE INVENTION

The present invention is directed to a remote convenience system for remotely controlling a function, and is particularly directed to a remote convenience system in which inadvertent function activation is avoided.

BACKGROUND OF THE INVENTION

Remote convenience systems are known in the art. A remote convenience system includes a remote transmitter and a receiver. A signal transmitted from the transmitter contains at least one remote control function request. In response to receipt of the signal, the receiver causes performance of the requested function. In order to cause the transmitter to transmit the appropriate desired remote function request signal, the transmitter operator actuates an appropriate transmitter button.

One particular type of remote convenience system is used in conjunction with a vehicle. The remotely controlled functions for such a vehicle-based remote convenience system include remotely controlled locking and unlocking of the doors, and trunk releasing. Additional functions include an auto alarm activation/deactivation function, a vehicle find function, and a panic alert function. Remote convenience vehicle systems that include the door lock/unlock functions are commonly referred to as remote keyless entry (RKE) systems.

In one known type of remote convenience system, the transmitter unit is integrated into a portion (e.g., the key head) of a key. For example, in a remote convenience vehicle system, the transmitter is integrated into the ignition and/or door key. The key is grasped during insertion and turning of the key within a lock or an ignition switch. It is possible to inadvertently actuate one or more of the buttons associated with the integrated remote convenience transmitter while the key is grasped for insertion and turning.

A theft deterrent system for an automobile utilizes a transponder integrated into an ignition and/or door key, and an interrogation sensor associated with the lock or ignition switch paired with the key. When the key is inserted into the lock or ignition switch, the interrogation sensor causes the transponder to transmit a coded message for receipt by the sensor. If the sensor receives an appropriate security code, the sensor provides a signal or message that permits the desired action to occur upon turning of the key. For example, an appropriate signal from the sensor will cause an electronic engine control to be enabled (e.g., an electronic fuel control is enabled).

SUMMARY OF THE INVENTION

In accordance with one aspect, the present invention provides a remote convenience system. Remote control means of the system remotely control a remote convenience function. The remote control means includes transmitter means for transmitting a signal having a request for performance of the function. The remote control means also includes receiver means for receiving the transmitted signal and for causing performance of the requested remote convenience function. Sensor means senses the transmitter means proximately located to the sensor means and provides a signal indicative thereof. Disable means disables the remote control means in response to the signal indicating the transmitter means proximately located to the sensor means.

In accordance with another aspect of the present invention, a remote convenience system has transmitter means for transmitting a signal having a remote convenience function request. Receiver means receives the transmitted signal and causes performance of the requested remote convenience function. Sensor means sense the transmitter means proximately located to the sensor means and provides a signal indicative thereof. Disable means disables the receiver means in response to the signal indicating the transmitter means proximately located to the sensor means.

In accordance with another aspect, the present invention provides a remote convenience vehicle system for a vehicle. Transmitter means transmits a signal having a remote convenience vehicle function request. Receiver means associated with the vehicle receives the transmitted signal and causes performance of the requested remote convenience vehicle function. Sensor means located proximate an ignition switch of the vehicle senses the transmitter means proximately located to the ignition switch of the vehicle and provides a signal indicative thereof. Disable means disables the receiver means in response to the signal indicating the transmitter means proximately located to the ignition switch.

In accordance with another aspect, the present invention provides a remote convenience system. Transmitter means, connected with a key, transmits a signal having a remote convenience function request. Receiver means receives the transmitted signal and causes performance of the requested remote convenience function. Sensor means, associated with a key receptacle, senses the key, with the connected transmitter means, proximately located to the key receptacle and provides a signal indicative thereof. Disable means disables the receiver means in response to the signal indicating the key, with the connected transmitter means, is proximately located to the key receptacle.

In accordance with another aspect, the present invention provides a receiver of a remote convenience system for receiving a transmitted signal conveying a request for performance of a remote convenience function and for causing performance of the function. The system has transmitter means for transmitting the request-conveying signal. The receiver includes means for preventing performance of a remote control function request. The receiver includes means for receiving a message from a sensor means that senses the transmitter means proximate to the sensor means. The receiver also includes means for controlling the means for preventing in response to the message.

In accordance with the present invention, a method of remotely controlling performance of a convenience function is provided. A signal is transmitted from a transmitter. The signal conveys a remote convenience function request. The transmitted signal is received for causing performance of the requested remote convenience function. The transmitter is sensed as being proximately located to a predetermined location. Performance of the requested remote convenience function is prevented in response to sensing the proximately located transmitter.

DESCRIPTION OF DRAWINGS

The foregoing and other features and advantages of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
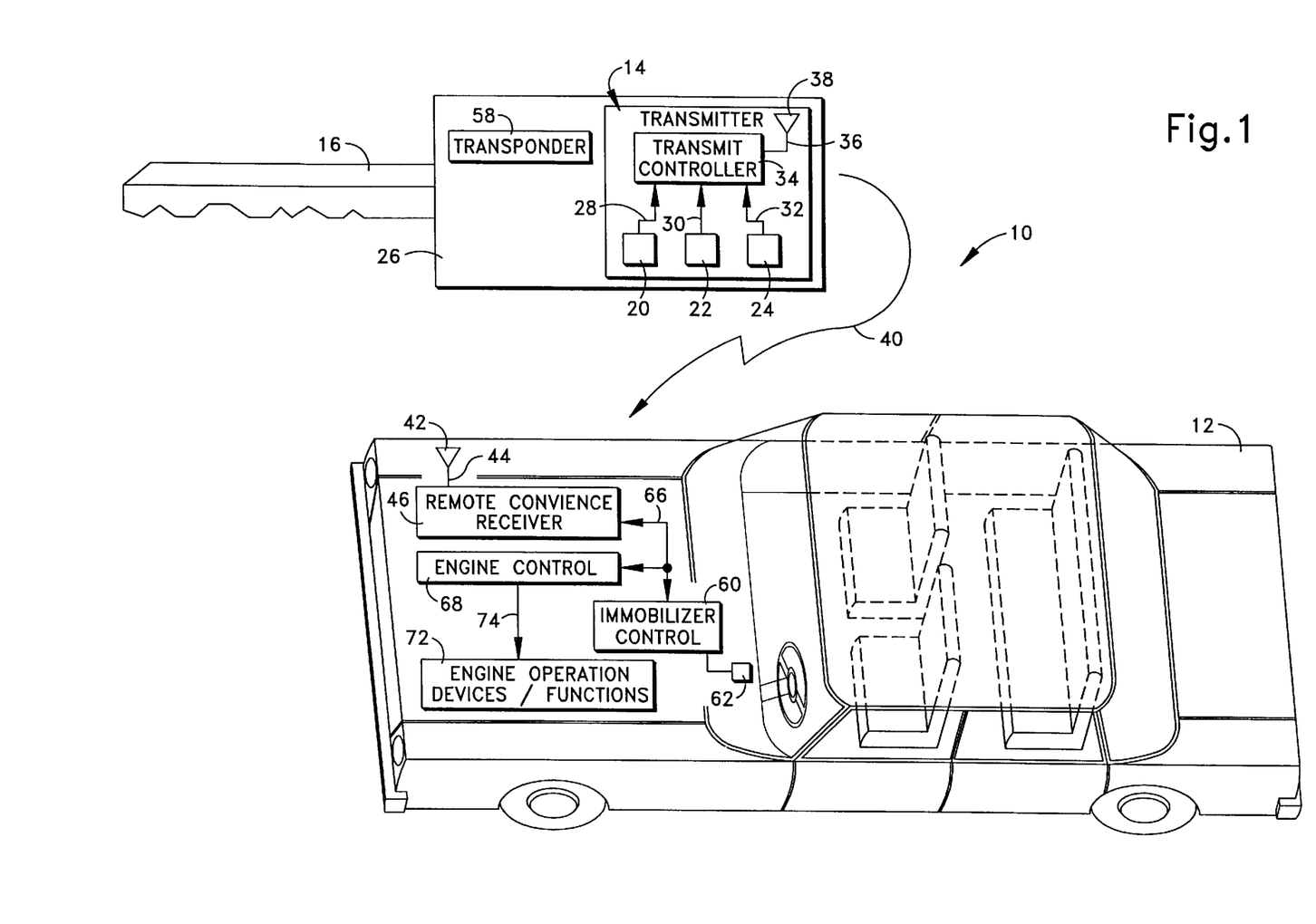
FIG. 1 is a schematic illustration of an example of a remote convenience system in accordance with the present invention and associated with a vehicle.

A remote convenience system 10 in accordance with the present invention is schematically shown, along with an associated vehicle 12, in FIG. 1. The system 10 includes a transmitter unit 14 that is integrated into an ignition key 16 for the vehicle 12. Hereinafter, the transmitter unit 14 is simply referred to as the transmitter.

The transmitter 14 has a plurality of manually actuatable buttons 20–24 that are mounted on a head 26 of the key 16. Each button 20–24 is associated with a remote function request. In the illustrated embodiment, button 20 is associated with a panic mode request, button 22 is associated with a lock function request, and button 24 is associated with an unlock function request. A person of ordinary skill in the art will appreciate that another button arrangement could be used.

The buttons 20–24 are connected to provide signals 28–32 to a transmit controller 34. In response to actuation, or a series of actuations, of one or more of the buttons 20–24, the transmit controller 34 provides a signal 36 to a transmission antenna 38. The transmit controller 34 and the antenna 38 are shown in FIG. 1 as being "exposed" on the key 16. The exposed view is for ease of illustration purposes only, and it is contemplated that these, and certain other, structural elements are suitably enclosed within the key 16 for protection against damage from environmental elements, etc.

The signal 36 is a serial signal and conveys a message packet that includes the function request, at least one appropriate security code, parity code, etc. In response to the stimulus of the signal 36, the transmission antenna 38 emits a radio frequency (RF) signal 40 that conveys the message packet. Any known circuitry arrangement for the transmitter 14 can be used. Thus, a detailed description for a particular circuitry arrangement is omitted for brevity.

The RF signal 40 is a broadcast signal, and is intended for reception by an antenna 42 at the vehicle 12. In response to the RF signal 40, the antenna 42 outputs an electrical signal 44, conveying the message packet, to a vehicle-based, remote convenience receiver unit 46. Hereinafter, the receiver unit 46 is simply referred to as the receiver. It is to be noted that the location and arrangement of the antenna 42, the receiver 46, and certain other components within the vehicle 12 is for illustration purposes only, and is not to be construed as a limitation of the scope of the invention.

Figure 2:
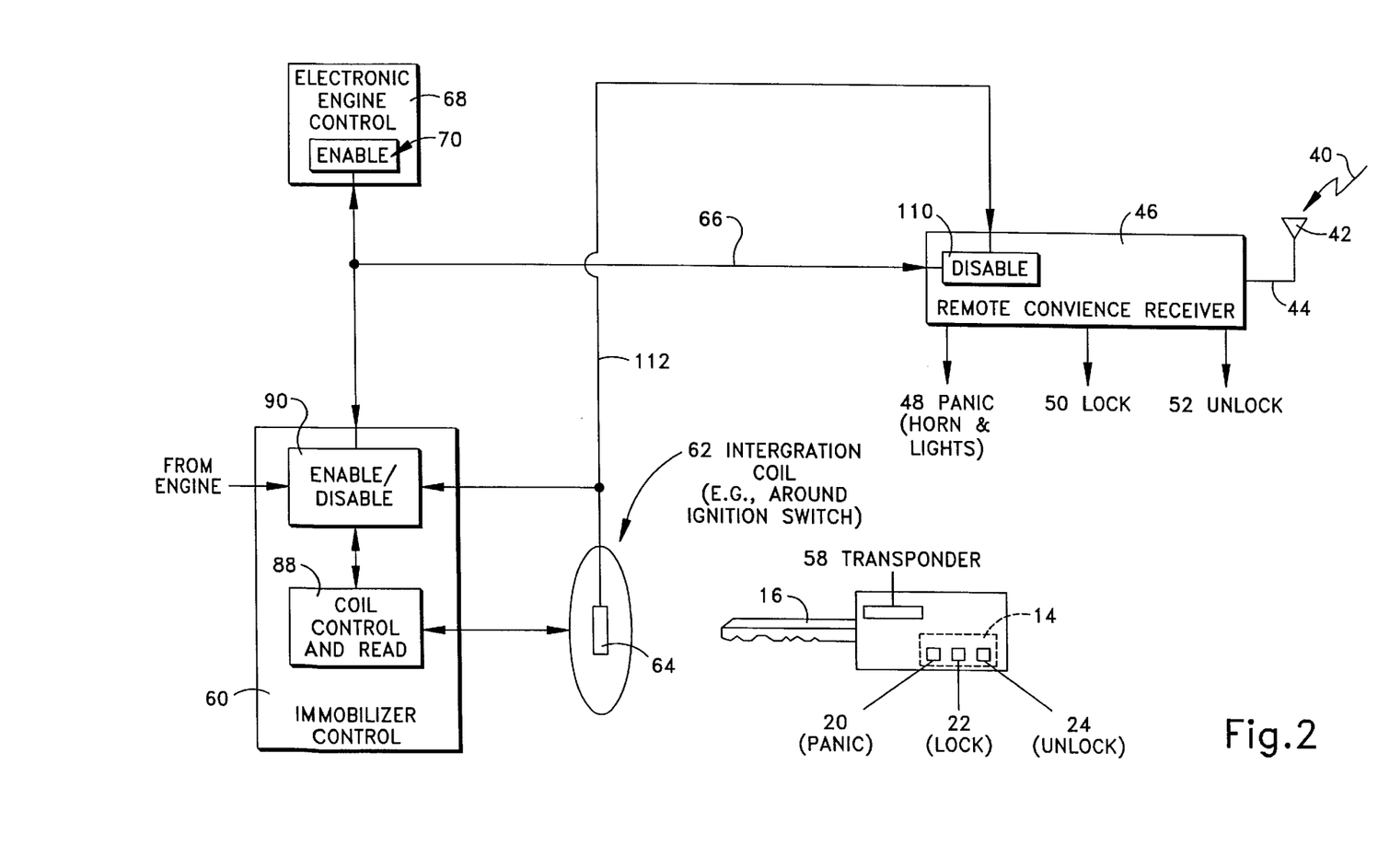
FIG. 2 is a block diagram showing a portion of the system of FIG. 1.

The receiver 46, after verification of the security code, etc., provides a signal (e.g., signal 48, FIG. 2) that causes the requested remote convenience function to be performed. For example, if the requested remote convenience function is lock (or unlock) the vehicle door locks, the door lock actuators are appropriately controlled via signal 50 (or signal 52 to unlock). As another example, if the requested function is to actuate a panic mode, the vehicle's lights and horns are activated, via signal 48, to draw attention to the vehicle 12. Any known circuitry arrangement for accomplishing the above-mentioned remote convenience functions by the receiver 46 may be used. Thus, a detailed description of a particular circuitry arrangement for this aspect of the receiver is omitted for brevity.

The vehicle 12 (FIG. 1) and the associated ignition key 16 include components for vehicle theft prevention. In the preferred embodiment, the key 16 and the vehicle 12 have components of a cryptographic contactless identification system using a magnetic coupling interface technique. The purpose of the theft prevention components is to immobilize the vehicle 12 (e.g., prevent engine operation), unless the specific key 16, with its identification system component, is used to start the vehicle. Specifically, the theft prevention components help prevent "hot-wiring" and the use of unauthorized key copies to start the vehicle 12.

The theft prevention component of the key 16 is an integral transponder 58 that is energizable to emit a predetermined security code signal. The transponder 58 is shown in FIG. 1 as being "exposed" on the key 16. The exposed view is for ease of illustration purposes only, and it is contemplated that the transponder 58 may be enclosed within the key 16 for protection against damage from environmental elements, etc.

The theft prevention components of the vehicle 12 include an immobilizer control circuitry 60 (hereinafter "immobilizer control") and an interrogation coil 62. The immobilizer control 60 (FIG. 2) causes the interrogation coil 62 to energize and interrogate the transponder 58 within the key 16 when the key is adjacent to/inserted into an ignition switch 64 of the vehicle 12. The ignition switch 64 is considered to be a receptacle for the key 16. During the interrogation, the interrogation coil 62 receives the security code signal, and the security code is provided to the immobilizer control 60.

The immobilizer control 60 is connected to a vehicle serial communication bus 66. Preferably, the bus 66 is a J1850, CCD, or equivalent. Also, connected to the communication bus 66 is an electronic engine control unit 68 (hereinafter simply "engine control") of the vehicle 12. Specifically, an enable function 70 of the engine control 68 is connected to the communication bus 66 to receive signals regarding the results of an interrogation of the key 16.

The engine control 68 (FIG. 1) is connected to various engine operation enabling devices/functions 72, and outputs control signals 74 to the devices, such that the vehicle may be operated upon turning of the ignition key 16 in the ignition switch 64. For example, the engine operation enabling devices/functions 72 include an electric fuel pump, electric fuel injectors, etc. and the engine control 68 outputs appropriate signals 74 to operate the electric fuel pump, the electric fuel injectors, etc. Any known circuitry for the engine control 68 may be used, and a detailed description of the engine control circuitry is omitted for brevity.

During an interrogation sequence, if the immobilizer control 60 determines that the transponder 58 provided the correct security code, the immobilizer control provides a signal or message, indicating the reception of the correct security code, on the communication bus 66. The interrogation of the transponder 58, the provision correct security code by the transponder, and the determination that the provided security code is correct is a process to sense or detect the presence of the transponder near the interrogation coil 62. Further, since the transponder 58 is integral with the key 16, the detection of the transponder near the interrogation coil 62 equates to sensing or detecting the key near the interrogation coil. In addition, because the interrogation coil 62 is designed to interrogate an area in the locality of the ignition switch 64, the detection of the key 16 near the interrogation coil 62 equates to sensing or detecting the key near the ignition switch. Thus, in the illustrated embodiment, the immobilizer control 60 and the interrogation coil 62 are a means for sensing the proximately located key 16, with the integral transponder 58 and transmitter 14.

The correct-code-indicating message is sent from the immobilizer control 60, via the communication bus 66, to the engine control 68. In response to the correct-code indicating message from the immobilizer control 60, the engine control 68 provides the appropriate signals 74 to the engine operation enabling devices/functions 72 (e.g., the fuel pump), such that the vehicle 12 may be operated. Hereinafter, because the correct-code-indicating message is an instruction to permit engine operation, the correct-code-indicating message is referred to as an "engine enable message".

In addition to sending the engine enable message to the engine control 68, via the bus 66, the immobilizer control 60 also stores the engine enable message. The stored message is held for the purpose of possible subsequent requests for the engine enable message. The possibility of subsequent requests is described below.

Figure 3:
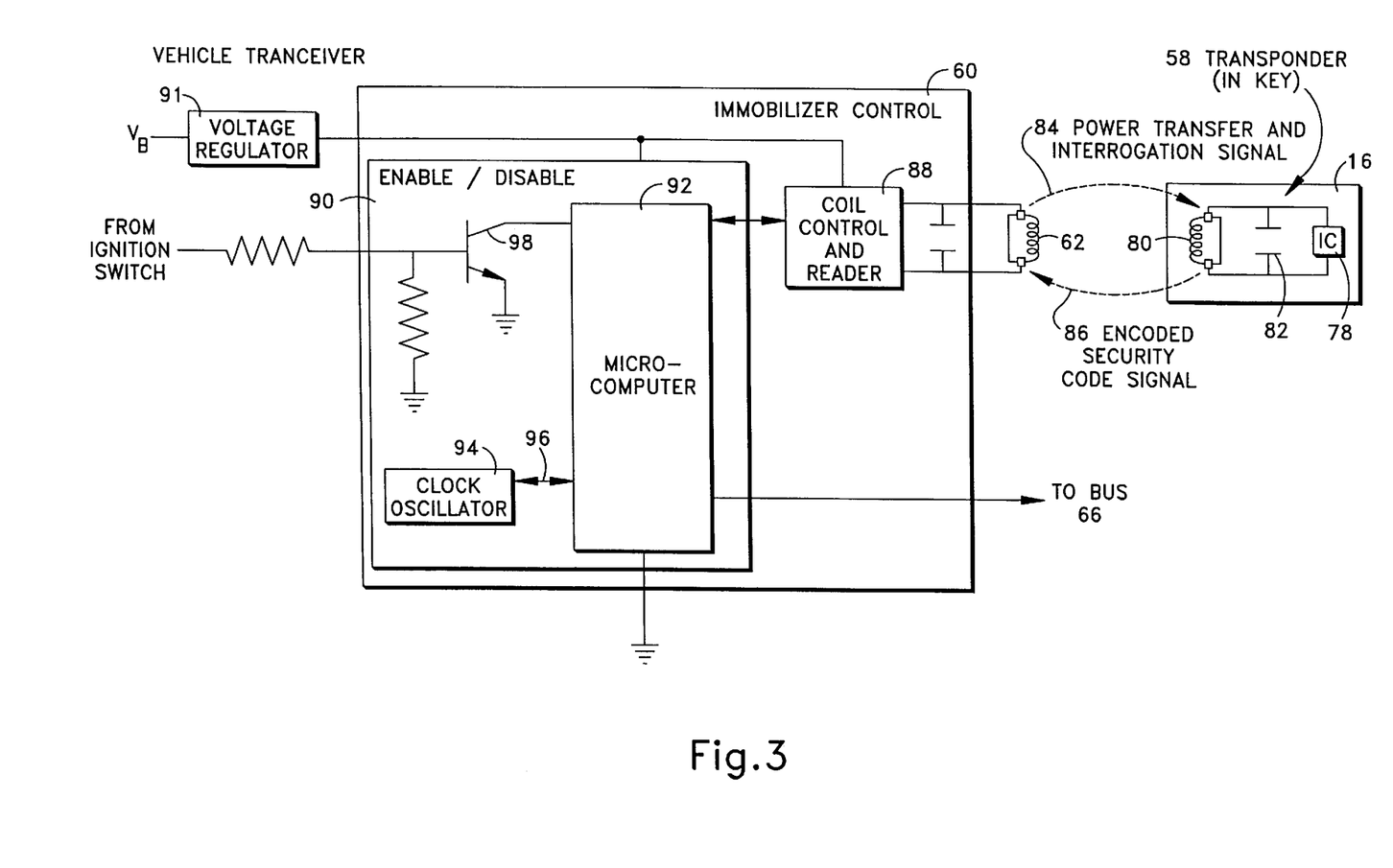
FIG. 3 is a schematic circuit diagram for a portion of the system shown in FIG. 1.

Focusing now on the transponder 58 and the immobilizer control 60, that comprise the anti-theft circuitry, a preferred arrangement is shown in FIG. 3. The transponder 58 within the key 16 includes integrated circuitry 78. Within the integrated circuitry 78 is a read only memory ("ROM") that stores the security code associated with the key/vehicle pair. Connected to the integrated circuitry are an antenna coil 80 and an energy storage circuit 82, such as a capacitor. The antenna 80 during the interrogation sequence receives a power transfer and interrogation signal 84 from the interrogation coil 62. Electrical energy is derived from the power transfer and interrogation signal 84, and the energy is stored in the capacitor 82. The electrical energy is used to power the integrated circuitry 78. In response to the power transfer and interrogation signal 84, the integrated circuitry 78 outputs an energizing signal that contains the security code to the antenna 80. The antenna 80 emits an encoded security code signal 86, which is intended for reception by the interrogation coil 62.

Within the immobilizer control 60 in the vehicle 12, the interrogation coil 62 is connected to coil control and reader circuitry 88 ("coil control and reader"), which is in turn connected to enable/disable circuitry 90 ("enable/disable"). A voltage regulator 91 that is connected to the battery (not shown) of the vehicle 12 provides electrical power for the coil control and reader 88 and the enable/disable 90.

Within the enable/disable 90 is a microcomputer 92 that has a ROM containing the security code for the vehicle 12. The microcomputer 92 instructs the coil control and reader 88 to interrogate the transponder 58, processes the security coded provided by the transponder 58 (e.g., compares the provided code to the security code stored within its ROM), and provides the engine enable message to the communication bus 66. The enable/disable 90 includes other circuitry connected to the microcomputer 92 that provide signals to the microcomputer to enable the microcomputer to perform its functions. Specifically, a clock oscillator 94 provides clocking signals 96 for use by the microcomputer 92 for timing and synchronization. Also, a transistor switch 98 is connected to a port of the microcomputer 92. The transistor 98 is controlled by a signal from the ignition of the vehicle 12. Thus, the microcomputer 92 is apprised of the state of the ignition switch of the vehicle 12.

Figure 4:
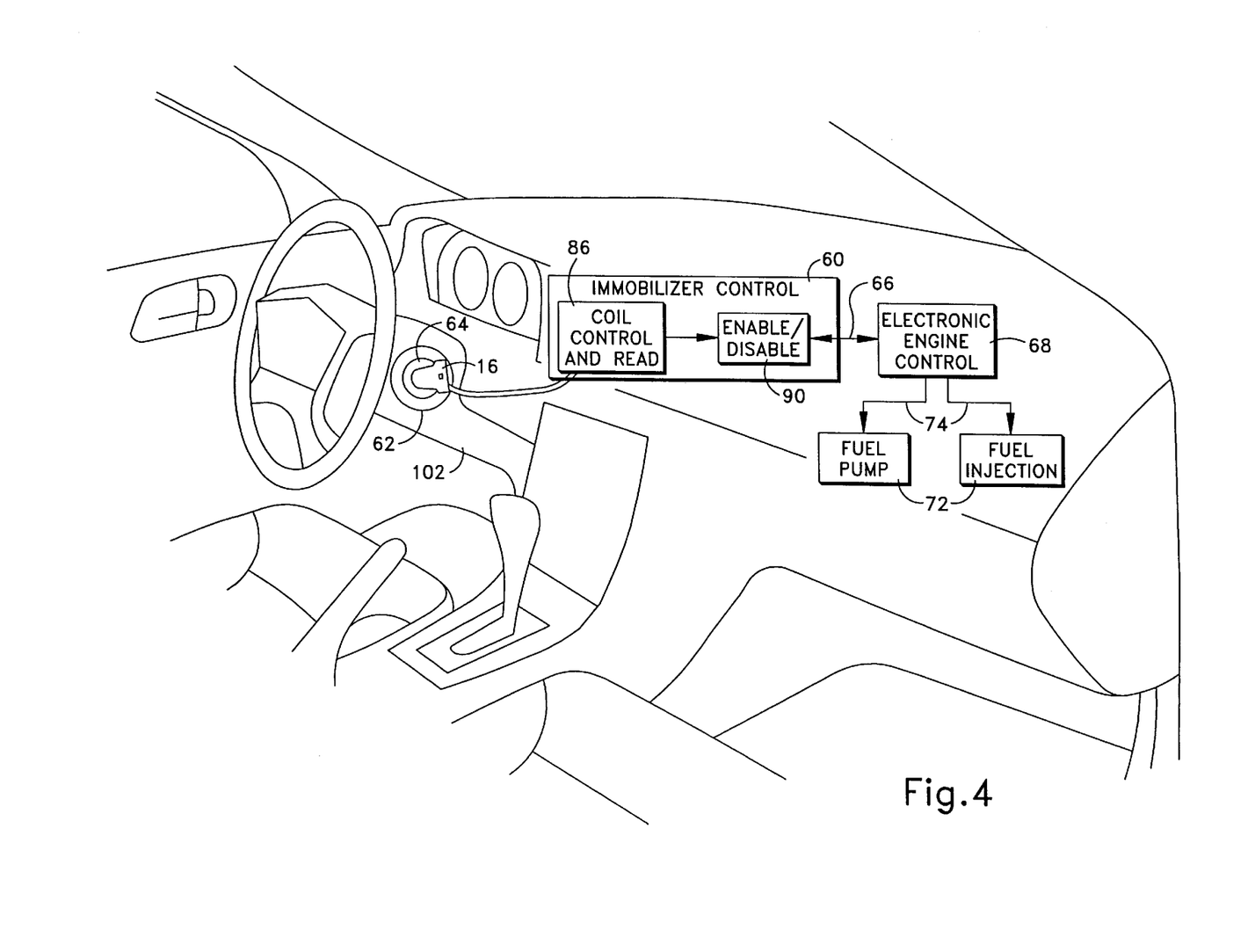
FIG. 4 is an illustration of a portion of the system shown in FIG. 1 and a portion of the vehicle, and shows a first mounting arrangement of sensory components.
Figure 5:
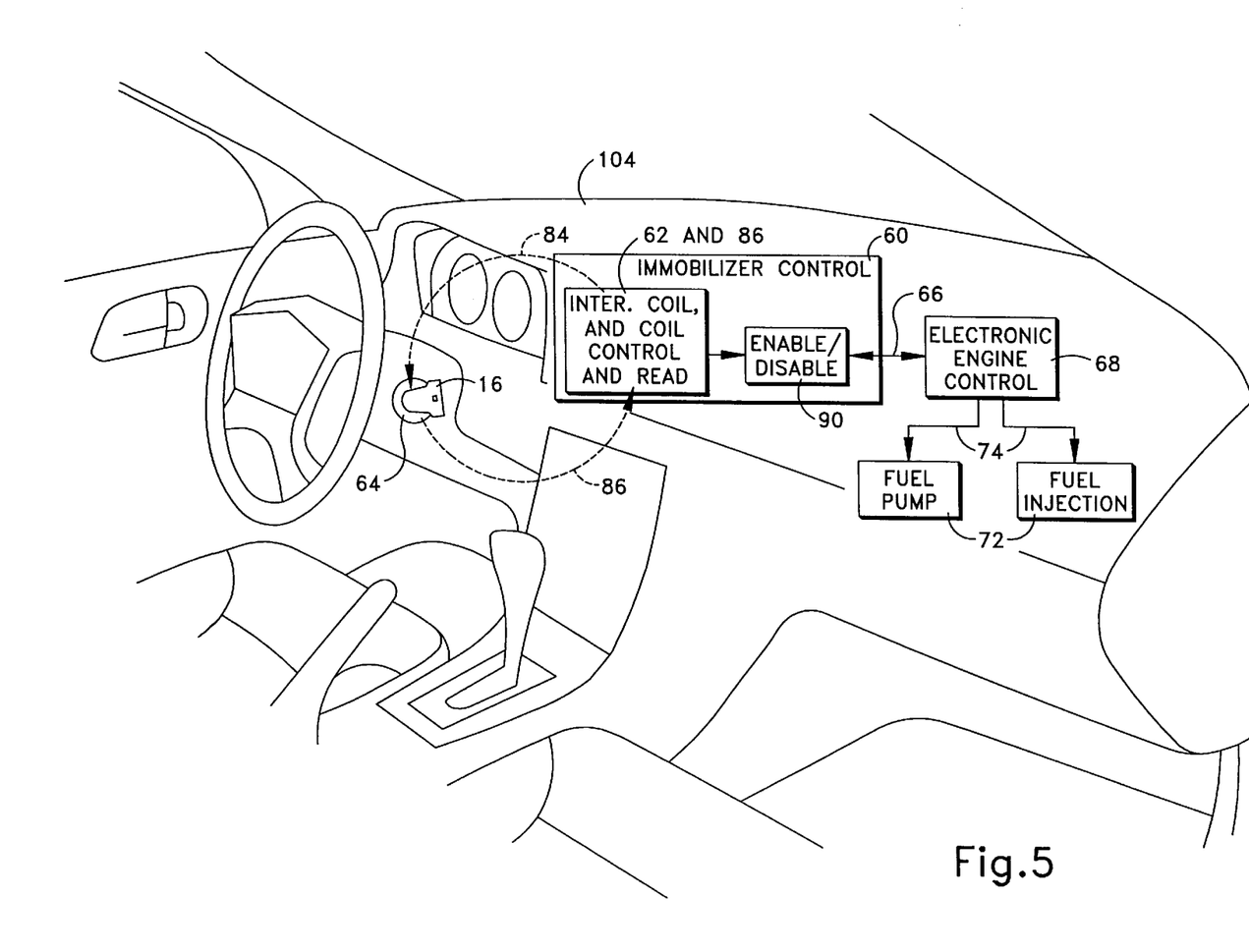
FIG. 5 is a view similar to FIG. 4 and shows an alternative mounting arrangement of sensory components.

The transponder 58 must be within range of the interrogation coil 62 for the interrogation sequence to occur. Typically, the interrogation sequence takes place shortly after the driver enters the vehicle 12 and while the key 16 is at or near the ignition switch 64. In order to accommodate the movements of the driver and to interrogate the transponder 58, two example arrangements are shown in FIGS. 4 and 5. In the example of FIG. 4, the interrogation coil 62 is located on a steering column 102 of the vehicle 12 at a position surrounding the ignition switch 64. In the example shown in FIG. 5, the interrogation coil 62 and the coil control and reader 88 are combined into a single device that is located in an instrument or dash panel 104 of the vehicle 12.

Focusing now upon the remote convenience function disabling feature in accordance with the present invention, the communication bus 66 (FIG. 2) is connected to a disable function 110 of the receiver 46 of the remote convenience system. As noted above, when the security code of the key matches the security code within the immobilizer control 60, the immobilizer control outputs the engine enable message onto the communication bus 66 to enable operation of the engine of the vehicle 12. Specifically, the engine enable message is provided to enable function 70 of the electronic engine control 68. In accordance with the present invention, the engine enable message is also provided to the disable function 110 of the receiver 46, via the communication bus 66.

In response to the message indicative of the security code from the transponder 58 of the key 16 matching the security code within the immobilizer control 60 (i.e., the engine enable message), the disable function 110 of the receiver 46 is activated to disable performance of the remote convenience functions (e.g., lock and unlock) of the remote convenience system. Specifically, any signal 40, which is transmitted from the transmitter 14 within the key 16, will not cause the associated remote convenience function to be performed. For example, if the button 22 is inadvertently pressed while the key 16 is being inserted into the ignition switch 64, the transmitted signal 40 contains a request to lock the doors. However, the receiver 46 "ignores" the signal 40, the lock signal 50 is not output from the receiver 46, and the lock actuators will not be operated to accomplish the door lock function, as a result of receiving the engine enable message from the immobilizer control 60.

The disable function 110 of the receiver 46 is also connected to receive a signal 112 from the electrical circuitry of the ignition switch 64 of the vehicle 12. When the ignition is turned "ON" and after a short delay, the signal 112 from the ignition switch 64 causes the disable function 110 of receiver 46 to re-enable the remote convenience functions.

Also, if the signal 40 is received while the remote convenience functions are disabled, the disable function 110 of the receiver 46 does query the immobilizer control 60 whether the remote convenience functions should remain disabled. Specifically, the disable function 110 of the receiver 46 requests that the immobilizer control 60 provide the engine enable message to the disable function 110. If the engine enable message is not provided, the disable function 110 immediately re-enables the remote convenience functions in response to the signal 40 and performs the requested remote convenience function.

Disabling the remote convenience functions avoids unwanted activation of when the driver inserts the key 16 into the ignition switch 64 and when the driver turns the key in the ignition switch. It is quite likely that, at this time, one of the buttons (e.g., 22) of the transmitter 14 integrated into the key 16 will be inadvertently actuated. The disablement of the receiver prevents inadvertent performance of one of the remote convenience functions due to the inadvertent button actuation.

Figure 6:
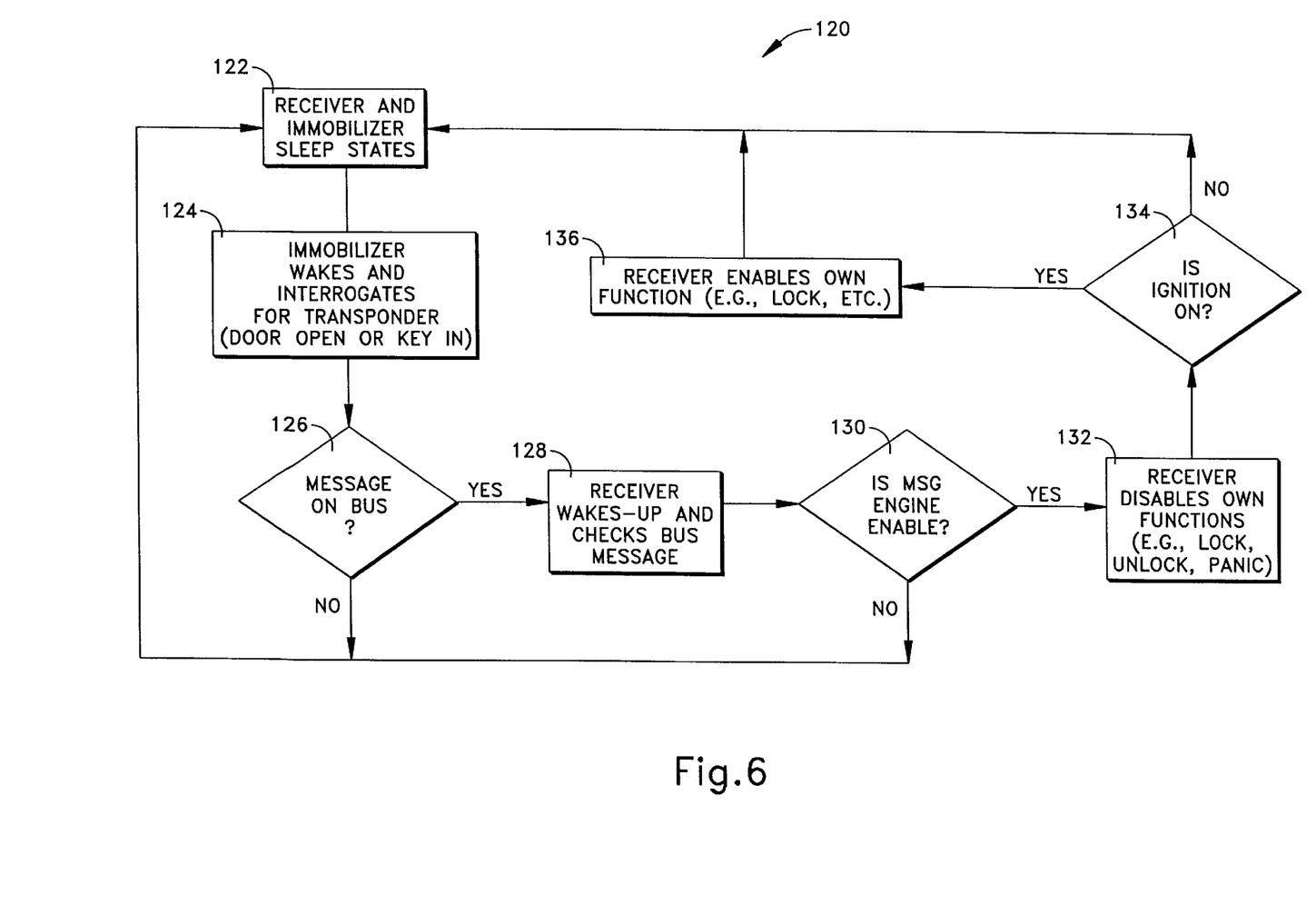
FIG. 6 is a flow chart of a process in accordance with the present invention and performed within the system shown in FIG. 1.

FIG. 6 illustrates a general process 120 performed within the system 10 for the engine immobilization/enablement and the remote convenience function disablement/re-enablement. The process 120 begins at step 122, in which the receiver 46 and the immobilizer control 60 are each in a sleep state. At step 124, the immobilizer control 60 wakes and performs an interrogation sequence to determine if the associated transponder 58 is present near the interrogation coil 62.

At step 126, it is queried whether an enable/disable message (i.e., a message pertinent to the process of enabling the engine and/or pertinent to the process of disabling the remote convenience functions) is present on the communication bus 66. If the determination at step 126 is negative, the process 120 goes to step 122. In other words, the receiver 46 and the immobilizer control 60 return to sleep states. A person of ordinary skill in the art will appreciate that other messages occur on the communication bus 66 for purposes other than mentioned herein. For such other messages, the receiver 46 and/or the immobilizer control 60 may remain "awake" to process the message and perform a function. For the purpose of brevity, the possibility and the effect of such other bus messages are not discussed herein.

If the determination at step 126 is affirmative (i.e., the message is pertinent to the process of enabling the engine and/or is pertinent to the process of disabling the remote convenience functions), the process 120 goes to step 128. At step 128, the receiver 46 "wakes-up" and checks the message on the communication bus 66. At step 130, the receiver 46 determines whether the message is the engine enable message (i.e., the security code from the key matches the security code within the immobilizer control 60, thus enabling operation of the engine). If the determination at step 130 is negative (i.e., the message is some other communication), the process 120 goes to step 122 and the receiver 46 returns to the sleep state. Again, the "sleep state" is used herein with reference to the enable/disable process. The receiver 46 may, in actuality, be performing other functions during the time period that is deemed herein as the sleep state.

If the determination at step 130 is affirmative (i.e., the message is the engine enable message), the process 120 goes to step 132. At step 132, the disable function 110 of the receiver 46 disables the remote convenience functions.

Upon completion of step 132, the process 120 goes to step 134, in which it is queried whether the ignition switch 64 is ON. If the determination at step 132 is negative (e.g., the ignition has not yet been activated), the process 120 goes to step 122 and the receiver 46 goes into the sleep state with its functions disabled.

If the determination at step 134 is affirmative (i.e., the ignition is ON), the process 120 goes to step 136. At step 136, the remote convenience functions of the receiver 46 are re-enabled. After step 136 is complete, the process goes to step 122 (the receiver unit goes into the sleep state), with the remote convenience functions enabled.

Figure 7:
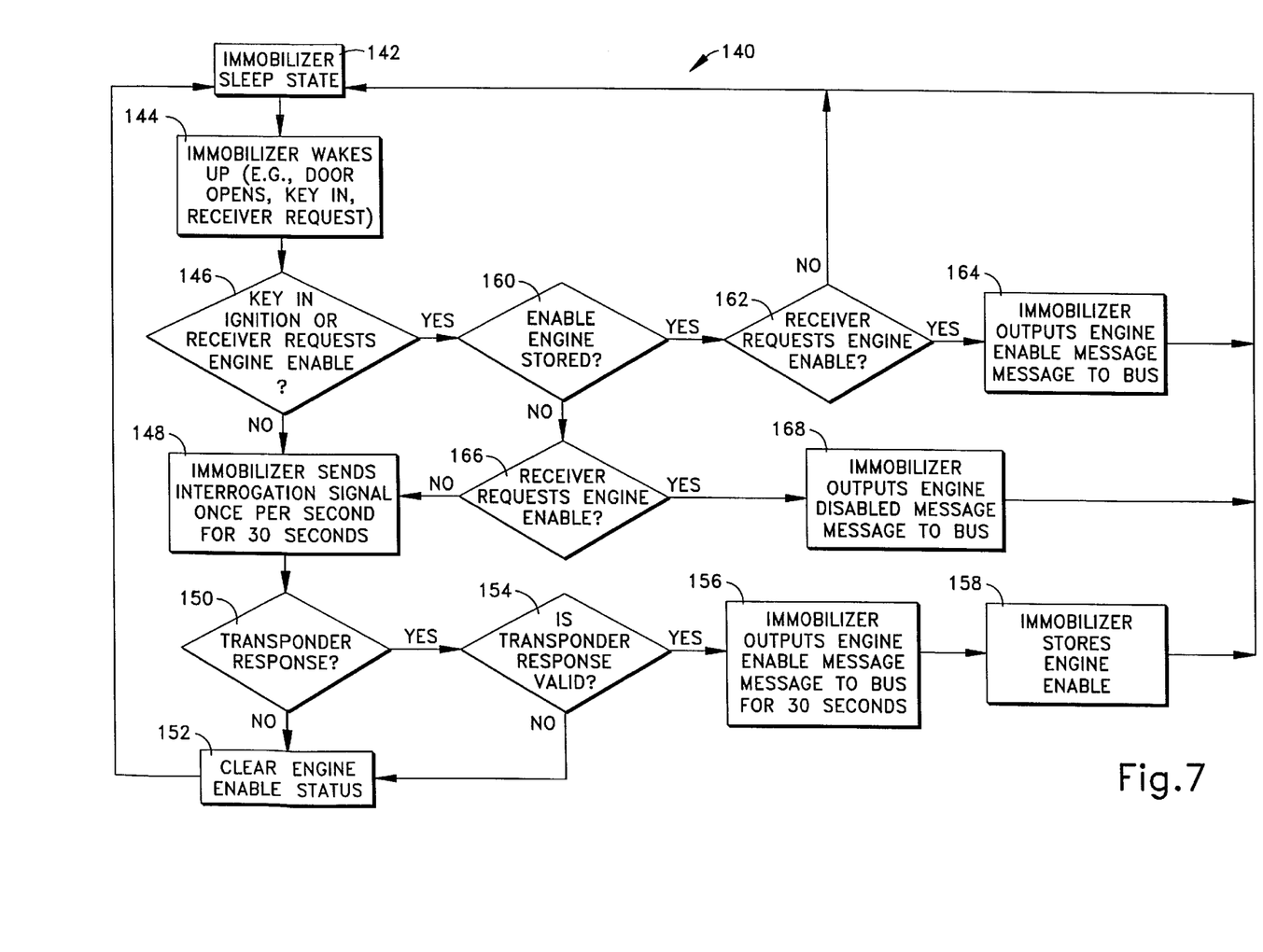
FIG. 7 is a flow chart of a process in accordance with the present invention and performed within an immobilizer control of the system shown in FIG. 1.

FIG. 7 is an illustration of a process 140 performed within the immobilizer control 60. The process 140 begins at step 142, in which the immobilizer control 60 is in the sleep state. At step 144, the immobilizer control 60 wakes in response to a stimulus. For example, the vehicle door may be opened, i.e., as sensed by a doorjamb sensor, a key may be inserted into the door or ignition switch 64, or the receiver 46 of the remote convenience function system may be requesting information. The immobilizer control 60 may be apprised of the stimulus via a message on the communication bus 66.

At step 146, it is queried whether the stimulus to the immobilizer control 60 is a key in the ignition switch 64 or a request from the receiver 46 for the engine enable message. If the determination at step 146 is negative (i.e., the stimulus is not a key in the ignition switch 64 and is not an engine enable message request from the receiver 46, but could be a door opening), the process 140 goes to step 148. At step 148, the immobilizer control 60 causes the interrogation coil 62 to output the power transfer and interrogation signal 84. In one preferred embodiment, the power transfer and interrogation signal 84 is sent once per second for thirty seconds.

Upon completion of step 148, the process 140 goes to step 150, in which it is queried whether the transponder 58 has provided a response to the interrogation (i.e., an encoded security code signal 86). If the determination at step 150 is negative (e.g., a key without the transponder 58 is near the ignition switch 64 or the security code signal 86 is not received by the interrogation coil 62), the process 140 goes to step 152. At step 152, the start permission status is cleared. When the start permission status is cleared, the engine cannot be operated. Upon completion of step 152, the process 140 goes to step 142 and the immobilizer control 60 returns to the sleep state.

If the determination at step 150 is affirmative (e.g., a security code signal is received by the interrogation coil 62.), the process 140 goes to step 154. At step 154, it is queried whether the received response is valid (i.e., whether the received security code matches the security code stored with the immobilizer control 60). If the determination at step 154 is negative (i.e., the key near the ignition switch 64 has a transponder that does not correspond to the vehicle 12), then the process 140 goes to step 152.

If the determination at step 154 is affirmative (i.e., the key 16 that corresponds to the vehicle 12 is near the ignition switch 64), the process 140 goes to step 156. At step 156, the immobilizer control 60 outputs the engine enable message onto the communication bus 66. In other words, the proper key is, or will be, used to start the car, and hence, starting the car is permitted. In one preferred embodiment, the engine enable message is output onto the communication bus 66 by the immobilizer control 60 for thirty seconds. At step 158, the immobilizer control 60 stores the engine enable message. Upon the completion of step 158, the process 140 goes to step 142, wherein the immobilizer control 60 returns to the sleep state.

Focusing now for a stimulus to the immobilizer control 60 which is a key insertion into the ignition switch 64 or a request for the engine enable message by the receiver 46, attention is directed to step 146 of the process 140. A key insertion into the ignition switch 64 or a request for the engine enable message by the receiver 46 results in an affirmative determination at step 146, and the process 140 goes to step 160. At step 160, it is queried whether the engine enable message has been stored by the immobilizer control 60.

If the determination at step 160 is affirmative (i.e., the immobilizer control 60 has the stored the engine enable message), the process 140 proceeds to step 162. At step 162, it is queried whether the receiver 46 requested the engine enable message (i.e., whether the stimulus to the immobilizer control 60 is the message request). If the determination at step 162 is negative (i.e., the stimulus to the immobilizer control 60 is the key in the ignition), the process 140 goes to step 142 (i.e., sleep state). This allow the immobilizer control 60 to go into the sleep state for the situation of the operator inserting the key 16 into the ignition switch 64, but not turning the key for a long period of time.

If the determination at step 162 is affirmative (i.e., the receiver 46 is requesting the start enable message and the immobilizer has the stored start enable message), the process 140 goes to step 164. At step 164, the immobilizer control 60 outputs the engine enable message to the communication bus 66 for the receiver 46. Upon completion of the step 164, the process 140 goes to step 142 (i.e., sleep state).

Focusing now upon the condition of the determination at step 160 being negative, such a condition results when the engine enable message has not been stored by the immobilizer control 60. For the negative determination at step 160, the process 140 proceeds to step 166.

At step 166, it is queried whether the receiver 46 is requesting the engine enable message. If the determination at step 166 is affirmative (i.e., the stimulus to the immobilizer control 60 is the receiver 46 requesting the engine enable message), the process 140 goes to step 168. At step 168, the immobilizer control 60 outputs a message to the communication bus 66 which indicates that the engine enable message has not been stored (i.e., the engine is disabled). Upon the completion of step 168, the process 140 goes to step 142.

If the determination at step 166 is negative (i.e., and the engine enable message is not stored and the stimulus is a key insertion into the ignition switch 64), the process 140 proceeds to step 148. Beginning at step 148, and continuing therefrom, the interrogation sequence is performed such that a determination can be made as to whether the key in the ignition is the appropriate key for the vehicle 12.

Figure 8:
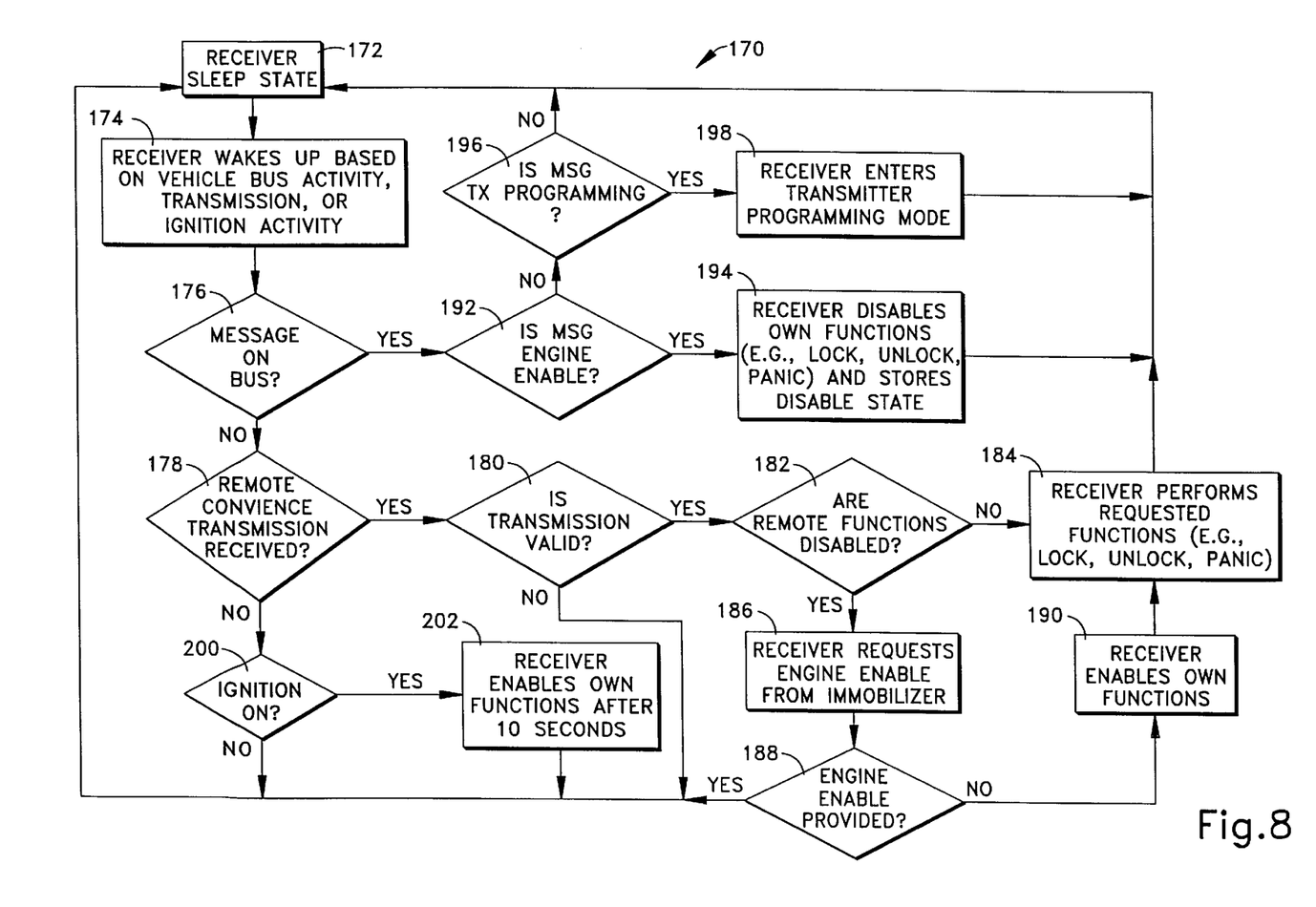
FIG. 8 is a flow chart of a process in accordance with the present invention and performed within a receiver of the system shown in FIG. 1.

An example of a process 170 performed within the receiver 46 is shown in FIG. 8. The process 170 begins at step 172, in which the receiver 46 is in the sleep state. At step 174, the receiver 46 wakes up based upon some stimulus. Specifically, the stimulus to the receiver 46 may be reception of a remote convenience function request transmission, activity on the communications bus 66, or ignition switch activity. From step 174, the process 170 goes to step 176, in which it is queried whether the stimulus to the receiver 46 is a message on the communication bus 66. If the determination at step 176 is negative (i.e., the stimulus is not a message on the communication bus 66), the process 170 goes to step 178. At step 178, it is queried whether the stimulus to the receiver 46 is a remote convenience request transmission. If the determination at step 178 is affirmative (i.e., the receiver 46 has received the signal 40), the process 170 goes to step 180.

At step 180, it is queried whether the received transmission is valid. Specifically, it is queried whether the signal 40 has the proper security code, parity, etc. If the determination at step 180 is negative (i.e., the transmission is invalid), the process 170 goes to step 172 and the receiver 46 goes to its sleep state. However, if the determination at step 180 is affirmative (i.e., the transmission is valid), the process 170 goes to step 182.

At step 182, it is determined whether the disable function 110 had previously disabled the remote convenient functions. If the determination at step 182 is negative, the process 170 goes to step 184, wherein the requested remote convenience function is performed. Upon completion of the step 184, the process 170 goes to step 172 (i.e., sleep state).

If the determination at step 182 is affirmative (i.e., the remote convenience functions are disabled), the process 170 goes to step 186. At step 186, the receiver 46 requests the engine enable message from the immobilizer control 60, via a message on the communication bus 66. At step 188, it is queried whether the immobilizer control 60 replies to the receiver 46 with the engine enable message. If the determination at step 188 is affirmative (i.e., the immobilizer control 60 provides the stored engine enable message), the process 170 goes to step 172 (i.e., sleep state). Specifically, the requested remote convenience function is not performed.

If the determination at step 188 is negative (i.e., the immobilizer control 60 does not have the engine enable message stored therein), the process 170 goes to step 190. An example of circumstances that would result in such a condition is when the driver moves the ignition key 16 close to the ignition switch 64 and the transponder 58 is interrogated. The driver then decides not to start the vehicle 12 and exits the vehicle with the ignition key. At step 190, the disable function 110 of the receiver 46 re-enables the remote convenience functions. The process goes to step 184 where the requested function is performed.

Focusing now on the situation in which the stimulus to the receiver 46 is a message on the communication bus 66, attention is directed to step 176. For such a situation, the determination at step 176 is affirmative and the process 170 goes to step 192. At step 192, it is determined whether the message on the communication bus 66 is the engine enable message. If the determination at step 192 is affirmative (i.e., the message is the engine enable message), the process 170 goes to step 194 in which the disable function 110 of the receiver 46 disables the remote convenience functions. Upon completion of step 194, the process 170 goes to step 172.

If the determination at step 192 is negative (i.e., the message is not the engine enable message), the process 170 goes to step 196. At step 196, it is determined whether the message on the communication bus 66 is a programming message. If the determination at step 196 is negative (e.g., a message which is not intended for use by the receiver 46), the process 170 goes to step 172 (sleep state). If the determination at step 196 is affirmative (i.e., a programming message), the process 170 goes to step 198, wherein the receiver 46 enters a programming mode. Various programming steps can occur which are not discussed herein for brevity, and upon completion of the step 198, the process 170 goes to step 172 (sleep state).

From the above description of the invention, those skilled in the art will perceive improvements, changes and modifications. For example, the system may use in a non-vehicle environment. Also, the transmitter need not be integrated with the key, and may be connected with the key by some other means, e.g., via a key chain. Further, the remote control functions may be disabled in another fashion, such as disabling the transmission and or reception of the function-requesting signal 40. Such improvements, changes and modifications within the skill of the art are intended to be covered by the appended claims.

Having described the invention, the following is claimed:

1. A remote convenience system comprising:
    remote control means for remotely controlling a remote convenience function, said remote control means including transmitter means for transmitting a signal having a request for performance of the function, and receiver means for receiving said transmitted signal and for causing performance of the requested remote convenience function;
    sensor means for sensing said transmitter means proximately located to said sensor means and for providing a signal indicative thereof; and
    disable means for disabling said remote control means in response to said signal indicating said transmitter means proximately located to said sensor means.

2. A system as set forth in claim 1, wherein said transmitter means is connected with a key, said sensor means including means for sensing the proximity of said key to a key receptacle.

3. A system as set forth in claim 2, wherein said system is a remote convenience system for a vehicle, said key is an ignition key for said vehicle, said key receptacle is an ignition switch of said vehicle, said ignition switch is actuatable by said ignition key, and said sensor means is located with respect to said ignition switch to provide said signal indicating said transmitter means proximately located to said sensor means as said ignition key is inserted into said ignition switch.

4. A system as set forth in claim 3, wherein said vehicle has means for preventing operation of an engine of said vehicle unless instructed to permit operation, said sensor means also for providing said signal indicating said transmitter means proximately located to said sensor means to said means for preventing operation as an instruction to permit operation of said engine.

5. A system as set forth in claim 3, wherein said key has a transponder for emitting a signal conveying a code associated with said vehicle, said sensor means includes an interrogation coil for receiving said signal containing the code and means for determining if the code is associated with said vehicle.

6. A system as set forth in claim 1, wherein said remote control means includes means for remotely controlling a lock actuator to transition between lock and unlock conditions, and said disable means includes means for preventing said means for remotely controlling from transitioning between the lock and unlock conditions.

7. A system as set forth in claim 6, wherein said system is a remote convenience system for a vehicle, said means for remotely controlling includes means for controlling a lock actuator associated with a vehicle door, and said disable means includes means for preventing said means for controlling from controlling the lock actuator.

8. A system as set forth in claim 1, wherein said remote control means includes means for remotely controlling an attention attracting emission, and said disable means includes means for preventing said attention attracting emission.

9. A remote convenience system comprising:
    transmitter means for transmitting a signal having a remote convenience function request;
    receiver means for receiving said transmitted signal and for causing performance of the requested remote convenience function;
    sensor means for sensing said transmitter means proximately located to said sensor means and for providing a signal indicative thereof; and
    disable means for disabling said receiver means in response to said signal indicating said transmitter means proximately located to said sensor means.

10. A system as set forth in claim 9, wherein said transmitter means is connected with a key, said sensor means including means for sensing the proximity of said key to a key receptacle.

11. A system as set forth in claim 7, wherein said system is a remote convenience system for a vehicle, said key is an ignition key for said vehicle, said key receptacle is an ignition switch of said vehicle, said ignition switch is actuatable by said ignition key, and said sensor means is located with respect to said ignition switch to provide said signal indicating said transmitter means proximately located to said sensor means as said ignition key is inserted into said ignition switch.

12. A system as set forth in claim 11, wherein said vehicle has means for preventing operation of an engine of said vehicle unless instructed to permit operation, said sensor means also for providing said signal indicating said transmitter means proximately located to said sensor means to said means for preventing operation as an instruction to permit operation of said engine.

13. A system as set forth in claim 11, wherein said key has a transponder for emitting a signal conveying a code associated with said vehicle, said sensor means includes an interrogation coil for receiving said signal containing the code and means for determining if the code is associated with said vehicle.

14. A system as set forth in claim 9, wherein said system is a remote convenience system for a vehicle, said vehicle has means for preventing operation of an engine of said vehicle unless instructed to permit operation, said sensor means also for providing said signal indicating said transmitter means proximately located to said sensor means to said means for preventing operation as an instruction to permit operation of said engine.

15. A system as set forth in claim 9, wherein said transmitter means includes means for transmitting a lock control signal conveying a door lock function request, said receiver means including means for receiving the lock control signal and for causing performance of the requested door lock function, and said disable means including means for preventing said receiver means from accomplishing performance of the requested door lock function.

16. A remote convenience vehicle system for a vehicle, said system comprising:
    transmitter means for transmitting a signal having a remote convenience vehicle function request;
    receiver means associated with said vehicle for receiving said transmitted signal and for causing performance of the requested remote convenience vehicle function;
    sensor means located proximate an ignition switch of said vehicle for sensing said transmitter means proximately located to said ignition switch of said vehicle and for providing a signal indicative thereof; and
    disable means for disabling said receiver means in response to said signal indicating said transmitter means proximately located to the ignition switch.

17. A system as set forth in claim 16, wherein said transmitter means is connected with an ignition key for said vehicle.

18. A system as set forth in claim 17, wherein said transmitter means is located within said ignition key, said sensor means is located with respect to said ignition switch to provide said signal indicating said transmitter means proximately located to the ignition switch as said ignition key is inserted into said ignition switch.

19. A system as set forth in claim 18, wherein said vehicle has a vehicle immobilizer which prevents operation of said vehicle until said vehicle immobilizer is instructed to permit vehicle operation, said sensor means also for providing said signal indicating said transmitter means proximately located to the ignition switch as the instruction to said vehicle immobilizer to permit vehicle operation.

20. A system as set forth in claim 19, wherein said location of said sensor means is on a steering column of said vehicle.

21. A system as set forth in claim 16, wherein the requested remote convenience vehicle function is a non-ignition vehicle function, and said disable means prevents performance of the non-ignition vehicle function in response to said signal indicating said transmitter means proximately located to the ignition switch.

22. A remote convenience system comprising:
    transmitter means, connected with a key, for transmitting a signal having a remote convenience function request;
    receiver means for receiving said transmitted signal and for causing performance of the requested remote convenience function; sensor means, associated with a key receptacle, for sensing said key, with said connected transmitter means, proximately located to said key receptacle and for providing a signal indicative thereof; and
    disable means for disabling said receiver means in response to said signal indicating said key, with said connected transmitter means, proximately located to said key receptacle.

23. A system as set forth in claim 22, wherein said key receptacle is an ignition switch.

24. A system as set forth in claim 22, wherein said disable means includes means for preventing said receiver means from causing performance of a requested remote convenience function.

25. A receiver of a remote convenience system for receiving a transmitted signal conveying a request for performance of a remote convenience function and for causing performance of the function, the system having transmitter means for transmitting the request-conveying signal, said receiver comprising:
    means for preventing performance of a remote control function request;
    means for receiving a message from a sensor means that senses the transmitter means proximate to the sensor means; and
    means for controlling said means for preventing in response to the message.

26. A method of remotely controlling performance of a convenience function, said method comprising:
    transmitting a signal from a transmitter, the signal conveying a remote convenience function request;
    receiving the transmitted signal and causing performance of the requested remote convenience function;
    sensing the transmitter proximately located to a predetermined location; and
    preventing performance of the requested remote convenience function in response to the step of sensing the proximately located transmitter.

27. A method as set forth in claim 26, wherein said set of sensing includes interrogation of a key transponder connected with the transmitter and determining that the key transponder is a proper key transponder.

* * * * *